(12) United States Patent
Gruss et al.

(10) Patent No.: US 9,310,101 B2
(45) Date of Patent: Apr. 12, 2016

(54) SET OF HEAT PIPES FOR SOLAR COLLECTORS

(75) Inventors: Jean-Antoine Gruss, Seyssinet (FR); Christian Lenotre, Bar-sur loup (FR); Alain Marechal, Tullins (FR); Didier Rossi, Toulon (FR); Michel Wohrer, Neuilly sur Seine (FR)

(73) Assignees: SOPHIA ANTIPOLIS ENERGIE DEVELOPPEMENT, Valbonne (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 445 days.

(21) Appl. No.: 13/138,405

(22) PCT Filed: Jan. 21, 2010

(86) PCT No.: PCT/FR2010/050088
§ 371 (c)(1),
(2), (4) Date: Nov. 16, 2011

(87) PCT Pub. No.: WO2010/092269
PCT Pub. Date: Aug. 19, 2010

(65) Prior Publication Data
US 2012/0048519 A1 Mar. 1, 2012

(30) Foreign Application Priority Data
Feb. 12, 2009 (FR) .................................. 09 50885

(51) Int. Cl.
*F28D 15/04* (2006.01)
*F24J 2/32* (2006.01)
(Continued)

(52) U.S. Cl.
CPC .. *F24J 2/32* (2013.01); *F24J 2/055* (2013.01);
*F28D 15/0266* (2013.01); *F28D 15/0275* (2013.01); *F28D 15/0283* (2013.01);
(Continued)

(58) Field of Classification Search
CPC ....................................... F24J 2/32; F24J 2/42
USPC ............. 165/104.26; 126/643, 271, 635, 637, 126/655
See application file for complete search history.

(56) References Cited

U.S. PATENT DOCUMENTS 3,901,036 A * 8/1975 Martin ...................... F03G 6/00
126/638
4,051,835 A * 10/1977 Hinson-Rider ............ F24J 2/08
126/674

(Continued)

FOREIGN PATENT DOCUMENTS

DE 20 2006 016100 U1 12/2006
EP 2 065 658 A1 6/2009
(Continued)

*Primary Examiner* — Kenneth Bomberg
*Assistant Examiner* — Shafiq Mian
(74) *Attorney, Agent, or Firm* — Davidson, Davdison & Kappel, LLC

(57) ABSTRACT

A set of heat pipes for solar collectors is provided. The set includes a plurality of heat pipes, each heat pipe being suitable for being laid out in a respective solar collector, and including a heat pipe fluid, a first sheet and a second sheet locally merged with each other and delimiting a reservoir. The reservoir containing the heat pipe fluid extends over a hot part for evaporating the heat pipe fluid and a cold part for condensing the heat pipe fluid, and is formed by an interstice between the two sheets. The reservoirs of at least two heat pipes are delimited by a same first sheet and a same second sheet.

25 Claims, 6 Drawing Sheets

(51) Int. Cl.
*F24J 2/05* (2006.01)
*F28D 15/02* (2006.01)

(52) U.S. Cl.
CPC ............... *Y02E 10/44* (2013.01); *Y02E 10/46* (2013.01); *Y10T 29/49353* (2015.01)

(56) References Cited

U.S. PATENT DOCUMENTS

| | | | | |
|---|---|---|---|---|
| 4,067,315 A | * | 1/1978 | Fehlner | F24J 2/055 126/636 |
| 4,080,957 A | * | 3/1978 | Bennett | 126/636 |
| 4,119,085 A | * | 10/1978 | Knowles et al. | 126/636 |
| 4,127,105 A | * | 11/1978 | Watt | F24J 2/265 126/636 |
| 4,172,491 A | * | 10/1979 | Rice | 165/10 |
| 4,257,402 A | * | 3/1981 | Westerman, II | F24J 2/055 126/652 |
| 4,299,203 A | * | 11/1981 | Skopp | F24J 2/055 126/569 |
| 4,306,543 A | * | 12/1981 | Doevenspeck | F24J 2/055 126/638 |
| 4,311,131 A | * | 1/1982 | Sabat | 126/637 |
| 4,335,709 A | * | 6/1982 | Slaats | 126/635 |
| 4,398,529 A | * | 8/1983 | Schoenfelder | F24D 17/0068 126/400 |
| 4,409,964 A | * | 10/1983 | Shimada | F24J 2/055 126/652 |
| 4,421,099 A | * | 12/1983 | van der Aa | F24J 2/32 126/635 |
| 4,440,151 A | * | 4/1984 | Yamamoto | F24J 2/05 126/637 |
| 4,488,539 A | * | 12/1984 | Lucassen | 126/635 |
| 4,686,961 A | * | 8/1987 | Garrison | F24J 2/32 126/635 |
| 4,911,145 A | * | 3/1990 | Ohashi | F24D 17/0021 126/584 |
| 6,047,697 A | * | 4/2000 | Best | F24J 2/05 126/635 |
| 6,817,357 B2 | * | 11/2004 | Brunotte | F24J 2/055 126/651 |
| 2008/0156314 A1 | * | 7/2008 | Heuer | F24J 2/055 126/650 |
| 2009/0107487 A1 | * | 4/2009 | Gee | F24J 2/055 126/635 |
| 2009/0139515 A1 | * | 6/2009 | Gee et al. | 126/655 |
| 2009/0178785 A1 | * | 7/2009 | Hassett | F28D 15/0275 165/104.26 |
| 2009/0293862 A1 | * | 12/2009 | Bailey | F24D 3/105 126/617 |

FOREIGN PATENT DOCUMENTS

| | | |
|---|---|---|
| JP | S5090235 | 7/1975 |
| JP | 56 034057 A | 4/1981 |
| JP | S572954 | 1/1982 |
| JP | 58 210 439 A | 12/1983 |
| JP | 59 183 254 A | 10/1984 |
| JP | 60 105 861 A | 6/1985 |
| JP | S61168750 | 7/1986 |
| JP | H11257882 | 9/1999 |
| JP | 2003042572 | 2/2003 |
| WO | WO 2008146269 A1 * | 12/2008 |

* cited by examiner

SET OF HEAT PIPES FOR SOLAR COLLECTORS

The present invention relates to a set of heat pipes for solar collectors, of the type comprising a plurality of heat pipes, each heat pipe of being suitable for being laid out in a respective solar collector, and comprising a heat pipe fluid, a first sheet and a second sheet locally merged with each other and delimiting a reservoir, the reservoir containing the heat pipe fluid, extending over a hot part for evaporating the heat pipe fluid and a cold part for condensing the heat pipe fluid, and being formed by an interstice between the two sheets.

The invention relates also to a set of solar collectors of the type comprising a plurality of solar collectors, each collector comprising:

an outer tube of circular cross-section, having two ends and being closed at a first of its ends, a solar radiation absorption layer arranged inside the outer tube, a respective heat pipe of a set of heat pipes, each outer tube being hermetically closed around the respective heat pipe at the second of its ends, a vacuum being formed inside said outer tube.

The invention relates also to a hot water production system comprising such a set of solar collectors, and a plant for generating electrical energy from solar energy comprising such a hot water production system.

The invention relates also to a method for manufacturing a set of heat pipes for solar collectors

BACKGROUND

A set of heat pipes for solar collectors of the abovementioned type is known. When such heat pipes are manufactured, two sheets are merged with each other, delimiting the reservoirs of the heat pipes. The two sheets are then cut according to the respective external outline of each of the heat pipes. Each respective reservoir is then filled with a heat pipe fluid.

The hot part of the heat pipe is then laid out in a respective solar collector, and the cold part of each respective heat pipe is connected to a pipe for transporting a heat transfer fluid intended to be heated.

However, the heat pipes have a high cost of manufacture. Furthermore, the set of heat pipes presents a risk of warping with the heat transfer fluid transport pipe, when the cold parts of the heat pipes are connected to this pipe, and when the latter lengthens under the effect of temperature.

SUMMARY OF THE INVENTION

It is an object of the present invention to reduce the cost of manufacture of the set of heat pipes.

The present invention provides a set of heat pipes of the abovementioned type, characterized in that the reservoirs of at least two heat pipes are delimited by a same first sheet and a same second sheet.

According to other embodiments, the set of heat pipes comprises one or more of the following features, taken in isolation or in any technically possible combination:

the cold parts of said at least two heat pipes are partly merged with each other in pairs, and the hot parts of said at least two heat pipes are separate;

the reservoirs of the heat pipes are hydraulically interlinked to form a single reservoir extending over the plurality of the heat pipes;

the sheets are metal sheets, preferably made of aluminum.

Another aspect of the invention is a set of solar collectors of the abovementioned type, characterized in that the set of heat pipes is as defined above.

According to other embodiments, the set of solar collectors comprises one or more of the following features, taken in isolation or in any technically possible combination:

each solar collector additionally comprises an inner tube of circular cross-section, arranged inside the outer tube, each tube having two ends and being closed at a first of its ends, and the tubes being sealed one to the other at the second of their ends, the tubes being separated by the vacuum;

the inner tube of each collector includes an outer surface oriented towards the outer tube of said collector, and an inner surface, the absorption layer of said collector is arranged against said outer surface, and for the hot part of the heat pipe of said collector, the reservoir is applied at least locally against said inner surface;

the hot part of each heat pipe is in the shape of a half-cylinder;

the cold part of each heat pipe is suitable for being arranged in contact with a cylindrical pipe, and said cold part is in the shape of a half-cylinder;

the axis of the half-cylinder of the hot part of each heat pipe is different from the axis of the half-cylinder of the cold part of the corresponding heat pipe, and the heat pipe includes a narrowing of its circumferential and/or longitudinal extent with respect to its extent in the regular part of the hot and cold parts, between the hot part and the cold part forming a connecting joint;

the collectors are substantially parallel with one another, and the set includes at least one connecting bar interconnecting the solar collectors, said bar being arranged substantially perpendicularly to the collectors and in contact with each outer tube near its first end.

Another aspect of the invention is a system for producing hot water from solar energy comprising:

a set of solar collectors suitable for heating a heat transfer fluid from solar energy, and a circuit for transporting the heat transfer fluid between the solar collectors and a hot water distributor, characterized in that the set of solar collectors is as defined above.

Another aspect of the invention is a plant for generating electrical energy from solar energy comprising:

a hot water production system, a heat sink, and an electricity-producing thermodynamic machine, using the hot water produced by said system and the heat sink, characterized in that the hot water production system is as defined above.

Another aspect of the invention is a method for manufacturing a set of heat pipes for solar collectors comprising a plurality of heat pipes, the method including:

assembling a first sheet and a second sheet delimiting between them the reservoirs of at least two heat pipes, while maintaining a connecting portion between two adjacent heat pipes among said at least two heat pipes, and filling the reservoirs with a heat pipe fluid.

According to another embodiment, the method comprises the following feature:

the assembly step includes:

depositing a special ink by screen printing the first sheet according to a desired pattern for a reservoir of each heat pipe, heating the first sheet and the second sheet, hot-rolling the two sheets to diffusion-weld the two sheets outside each pattern, injecting compressed air in the areas occupied by the ink patterns, to form each reservoir, and hermetically closing, by hot pressing, the ends of each reservoir with the exception of one filling end.

BRIEF DESCRIPTION OF THE DRAWINGS

These features and advantages of the invention will become clear from reading the following description, given purely by way of example, and with reference to the appended drawings in which:

In FIG. 1, a plant for generating electrical energy from solar energy includes a hot water production system 2, a heat sink 4 and an electricity-producing thermodynamic machine 6.

DETAILED DESCRIPTION

Figure 1:
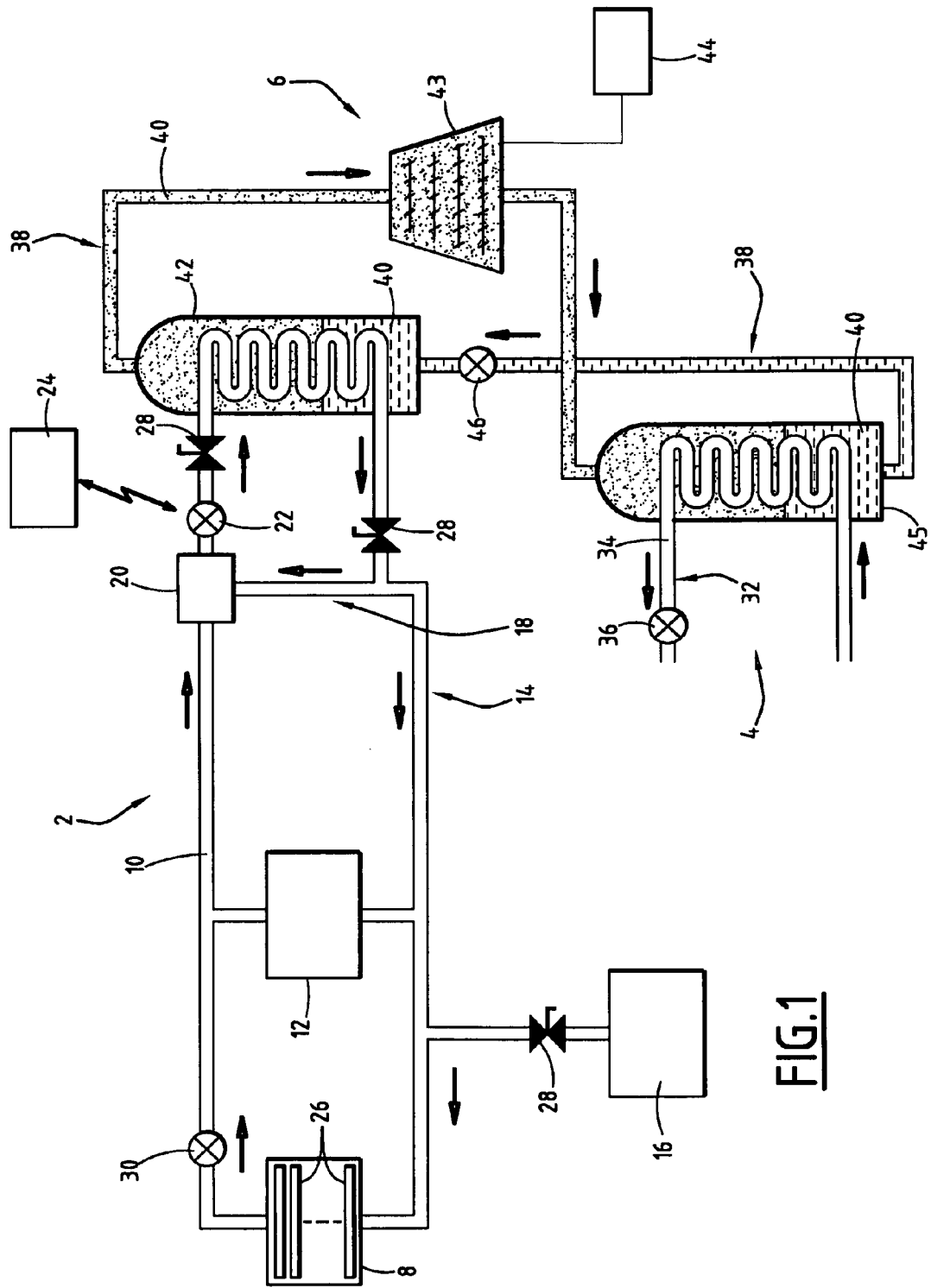
FIG. 1 is a schematic representation of an electrical energy generation plant according to the invention.

The hot water production system 2 comprises means 8 for heating, by solar energy, a first heat transfer fluid 10, such as water, means 12 for storing thermal energy and a first closed circuit 14 for transporting the first heat transfer fluid 10. The first circuit 14 links the heating means 8, the storage means 12 and the electricity-producing thermodynamic machine 6.

The hot water production system 2 comprises a storage tank 16 for relieving the first circuit 14, and a feedback loop 18 including a mixer 20 and a first pump 22. The installation includes means 24 for remotely controlling the loop 18.

The heating means 8 include a plurality of solar collectors 26 described in more detail later with reference to FIGS. 2 to 7.

The first circuit 14 includes a plurality of valves 28, the mixer 20, the first pump 22 and a second pump 30. The first circuit 14 includes an exchanger, in coil form, intended to transmit the heat transported by the heat transfer fluid 10 to the thermodynamic machine 6.

As a variant, the hot water production system 2 comprises a hot water distributor, and is not linked to an electricity-producing thermodynamic machine. The circuit 14 for transporting the heat transfer fluid 10 links the solar collectors 26 to the hot water distributor. The distributor comprises the exchanger intended to transmit the heat transported by the heat transfer fluid 10.

The heat sink 4 comprises a second circuit 32 for transporting a second heat transfer fluid 34, such as water. Circulation is provided by a pump 36.

The thermodynamic machine 6 comprises a third circuit 38 for transporting a working fluid 40, a boiler 42, a turbine 43 coupled to an electricity generator 44 and a condenser 45. A pump 46 circulates the working fluid 40 in the third circuit 38.

Figure 2:
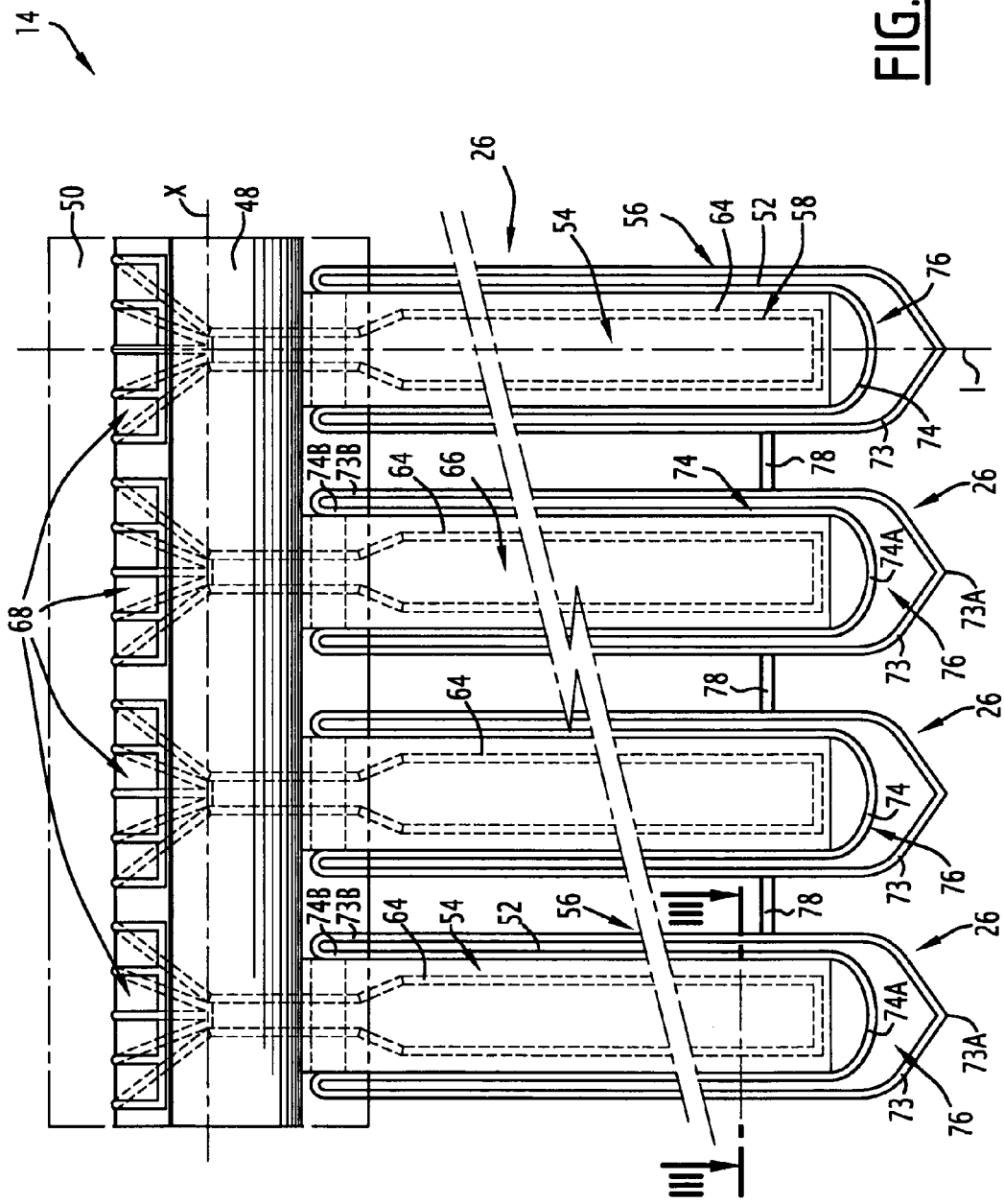
FIG. 2 is a schematic view from above of a set of four solar collectors according to the invention.

FIG. 2 illustrates a set of four solar collectors 26 connected to the first circuit 14. The first circuit 14 comprises a pipe 48 for transporting the first heat transfer fluid 10, and an insulating thermal sheath 50 arranged on the outer part of the pipe 48. The pipe 48 is cylindrical in shape, with an axis X oriented in a horizontal plane, not represented.

Each solar collector 26 comprises an absorption layer 52 for absorbing solar radiation, a heat pipe 54 and thermal insulation means 56. The absorption layer 52 is, for example, produced from pulverized aluminum nitrite. Each solar collector 26 extends according to an axis I inclined with respect to the horizontal plane. The axis I forms of an angle of inclination, with the horizontal plane, that is greater than 5°, preferably greater than 30°.

Figure 3:
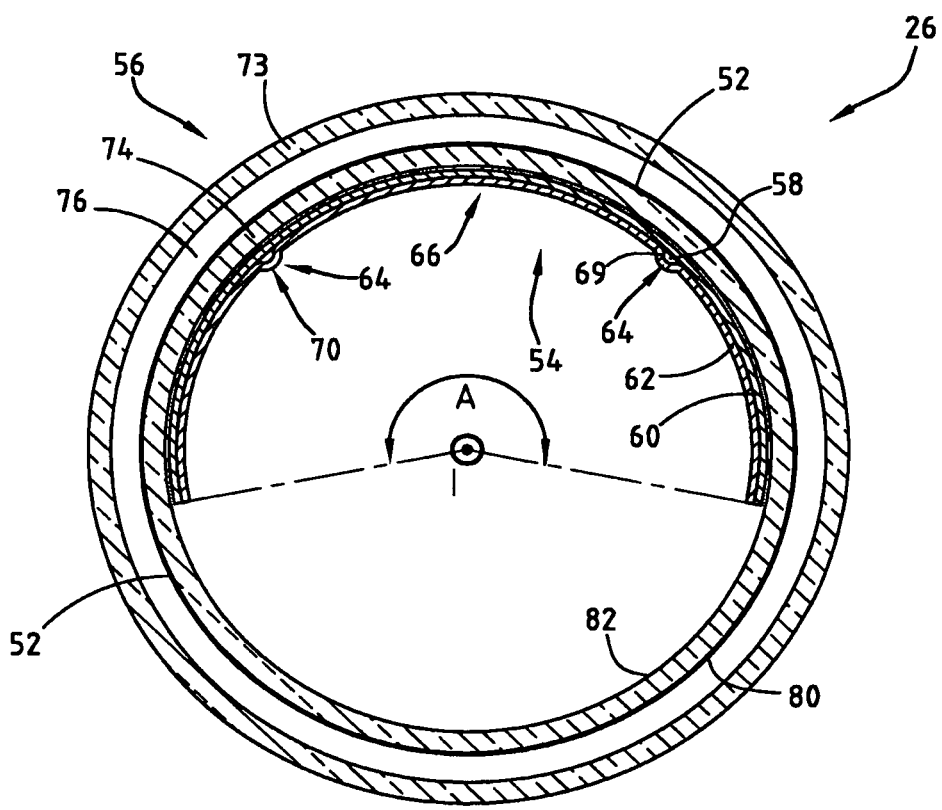
FIG. 3 is a view in cross-section on the plane III of FIG. 2.

In FIG. 3, each heat pipe 54 comprises a heat pipe fluid 58, as well as a first sheet 60 and a second sheet 62 locally merged with each other. The two sheets 60, 62 delimit a reservoir 64 containing the heat pipe fluid 58. The heat pipe fluid 58 is, for example, methanol, ethanol, an HFC refrigerant or an HCFC refrigerant.

The reservoir 64 extends over a hot part 66 for evaporating the heat pipe fluid and a cold part 68 for condensing the heat pipe fluid, as represented in FIG. 2. The reservoir 64 is formed by an interstice 69 between the two sheets 60, 62. The sheets 60, 62 are, for example, produced from a metal, such as aluminum.

Figure 4:
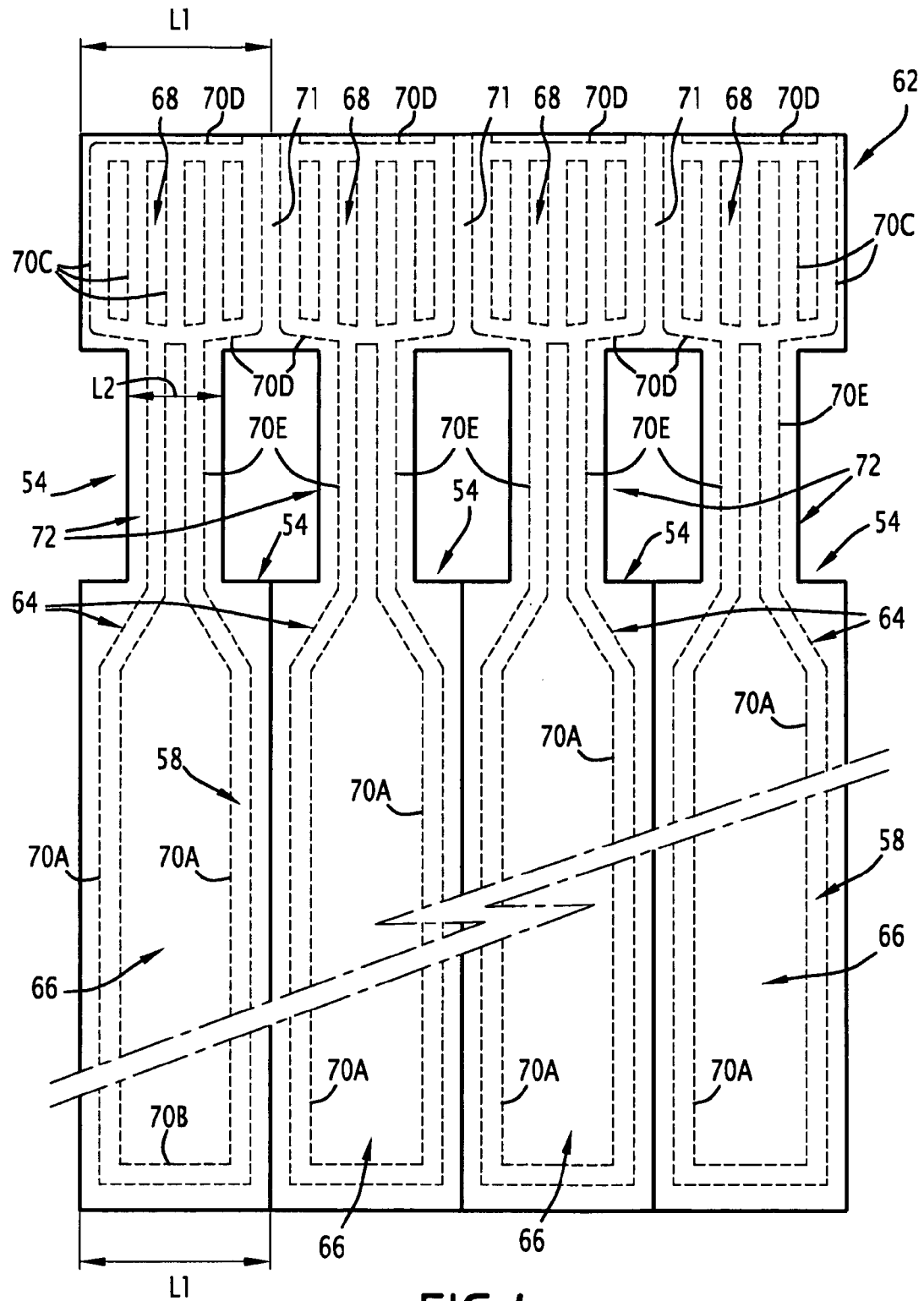
FIG. 4 is a schematic view from above of a set of heat pipes of FIG. 2, according to a first embodiment of the invention.

FIG. 4 illustrates a set of heat pipes comprising four heat pipes 54. As a variant, the set of heat pipes comprises, for example, eight or twelve heat pipes 54.

The set of heat pipes exhibits a flat shape once it is manufactured, as represented in FIG. 4. The set of heat pipes is arranged according to a desired shape when it is laid out in a set of solar collectors, as represented in FIG. 2.

The reservoirs 64 of the four heat pipes 54 are delimited by the same first sheet 60 and the same second sheet 62.

Each reservoir 64 includes a branching of circulation channels 70 for the heat pipe fluid 58. Each reservoir 64 includes one or more circulation channels 70 in the hot part 66 of the heat pipe (two in the example illustrated), and several circulation channels 70 in the cold part 68 of the heat pipe (five in the example illustrated). The circulation channels 70 are linked and form with their extensions in the cold part a closed circuit for the heat pipe fluid 58. Each of the channels 70 is oriented substantially in line with the axis I of the corresponding solar collector. The term "substantially" is understood to mean an angular tolerance of ±5°.

The channels 70 exhibit first parallel rectilinear sections 70A extending into the hot part 66. They are linked at their free end by a first connecting pipe 70B. The channels 70 exhibit second parallel rectilinear sections 70C extending into the cold part 68. They are connected at their ends by second connecting pipes 70D. The sections 70A and 70C are linked by a group of convergent 70E then divergent sections arranged in regions of change of curvature of the heat pipes 54.

The hot parts 66 of the four heat pipes 54 are separate from one another.

The cold parts 68 of the four heat pipes 54 are merged by three connecting portions 71, each connecting portion 71 being laid out between two adjacent cold parts 68. Each connecting portion 71 extends according to a direction of extension of the respective heat pipes 54.

Each heat pipe 54 includes a narrowing 72 of its circumferential extent between the hot part 66 and the cold part 68, with respect to its extent in the regular part of the hot 66 and cold 68 parts. The narrowing 72 forms a connecting joint between the hot part 66 and the cold part 68.

The hot part 66 and the cold part 68 exhibit, for example, a same first width L1 perpendicularly to the direction of extension of the heat pipes 54. The first width L1 is, for example, equal to 80 mm. The narrowing 72 exhibits, perpendicularly to the direction of extension, a second width L2 having a value less than that of the first width L1. The second width is, for example, equal to 32 mm.

The insulation means 56, visible in FIG. 3, surround the absorption layer 52 in a manner that is substantially hermetic and are suitable for letting solar radiation through. The insulation means 56 are suitable for thermally insulating the absorption layer 52 and the hot part 66 of the heat pipe against climatic conditions outside the solar collector 26.

The insulation means 56 comprise an outer tube 73 and an inner tube 74 arranged inside the outer tube 73. The tubes 73, 74, substantially cylindrical, exhibit a circular cross-section, and are concentric about the axis I. The outer tube 73 has a first end 73A and a second end 73B. The inner tube 74 has a first end 74A and a second end 74B.

As represented in FIG. 2, each tube 73, 74 is closed in the shape of a half-sphere at its first end 73A, 74A, and the tubes 73, 74 are sealed one to the other at their second ends 73B, 74B. The two tubes 73, 74 are separated by a vacuum 76. The tubes 73, 74 are, for example, produced from glass.

The first ends 73A, 74A are oriented opposite the transport pipe 48. The second ends 73B, 74B are oriented towards the transport pipe 48. The second end 74B of the inner tube is open. The insulation means 56 include an insulation stopper, not represented, inserted in the open end 74B of the inner tube.

The four collectors 26 are substantially parallel, and the set of collectors includes a connecting bar 78 interconnecting the solar collectors 26. The connecting bar 78 is arranged substantially perpendicularly to the collectors 26 and in contact with each outer tube 74 on the side of its first end 74A. More specifically, the connecting bar 78 is in contact with each of the collectors 26 in an area included between its first end 74A and the middle of its length. The term "substantially" is understood to mean an angular tolerance of ±5°.

The inner tube 74 includes an outer surface 80 oriented towards the outer tube 73, and an inner surface 82, visible in FIG. 3. The absorption layer 52 is arranged against the outer surface 80 of the inner tube.

The hot part 66 of each heat pipe is in the shape of a half-cylinder of axis I, as represented in FIG. 3. The cross-section of the hot part 66 is in the shape of an arc of a circle of angle A of between 180° and 220°.

The hot part 66 of each heat pipe, and in particular the part of the reservoir 64 contained in this hot part, is applied against the inner surface 82 of the inner tube.

As a variant, the insulation means 56 comprise only the outer tube 73 closed at one of its ends, the absorption layer 52 being arranged inside the outer tube 73. The absorption layer 52 is, for example, arranged on the surface of the hot part 66 of the heat pipe. The outer tube 73 is hermetically closed around the heat pipe 54 at the other of its ends, a vacuum 76 being formed inside the outer tube 73.

The cold part 68 of each heat pipe is in the shape of a half-cylinder of axis X laid out between the pipe 48 and the insulating sheath 50 while being wrapped around the pipe 48, as represented in FIG. 2.

The axis I of the half-cylinder of the hot part 66 is different from the axis X of the half-cylinder of the cold part 68.

Figure 5:
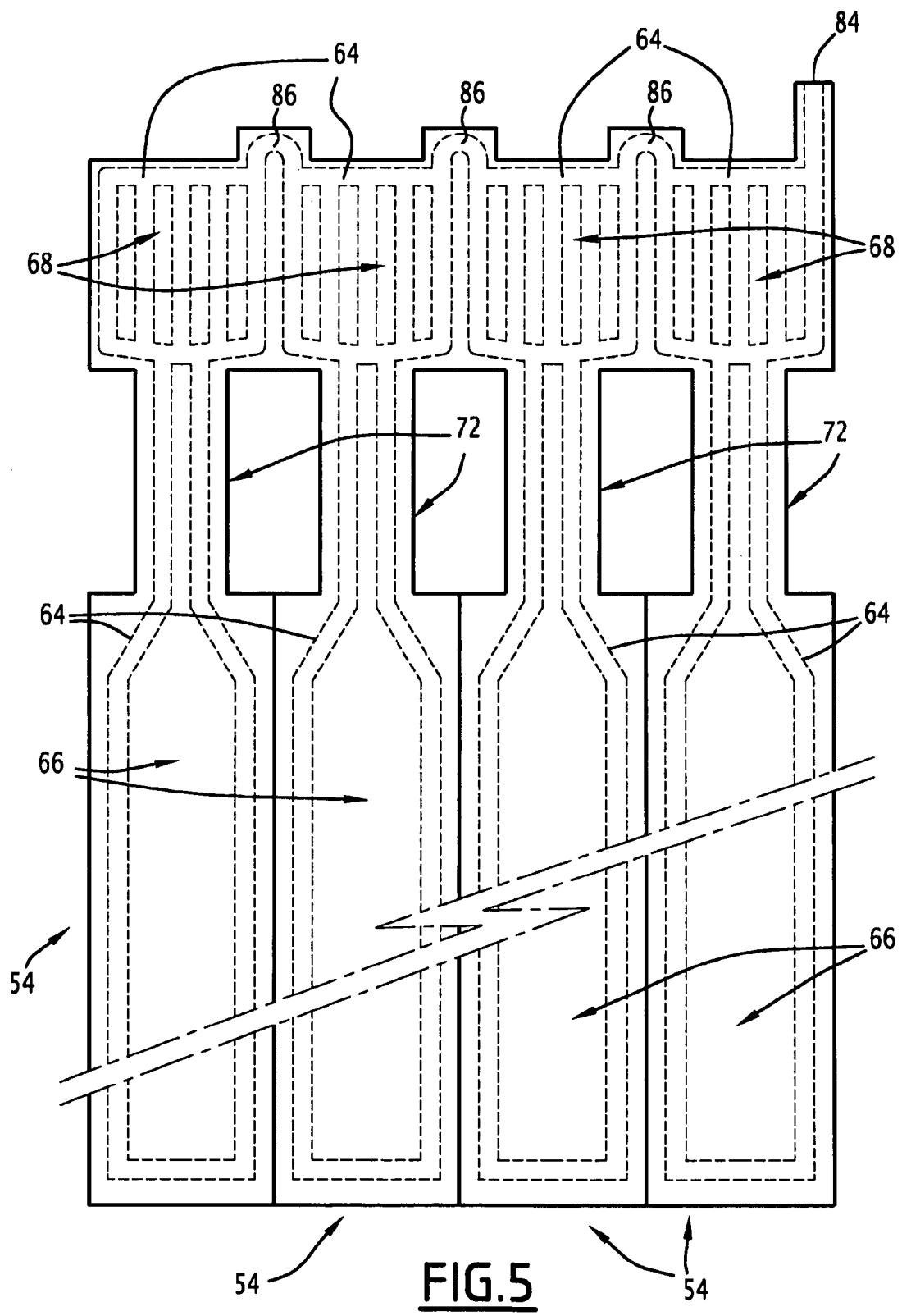
FIG. 5 is a schematic view of a manufacturing step for the set of heat pipes of FIG. 4.

A method for manufacturing the set of heat pipes, visible in FIGS. 4 and 5, includes an assembly step by hot-rolling the first sheet 60 and the second sheet 62 which delimit between them the reservoirs 64 of the four heat pipes 54, while maintaining the connecting portion 71 between two adjacent heat pipes 54. In the example embodiment of FIGS. 4 and 5, each connecting portion 71 is laid out between two respective cold parts 68.

The assembly step includes depositing a special ink by screen-printing the first sheet 60 according to a desired pattern for the reservoir 64 of each heat pipe 54, heating the first sheet 60 and the second sheet 62, and hot-rolling the two sheets 60, 62 to diffusion-weld the two sheets 60, 62 outside each pattern. The heating carried out is, for example, radiative heating.

The assembly step then includes a step for cutting according to the desired external outline of the set of heat pipes. The cutting is in particular carried out according to the outline of each of the hot parts 66, such that the hot parts 66 of the four heat pipes 54 are separate, and according to the outline of each of the narrowings 72. The cutting is carried out according to the overall external outline of the four cold parts 68 joined together. The cutting is carried out using a method such as shearing, nibbling, laser cutting, chemical cutting and water-jet cutting.

The assembly step then includes injecting compressed air at the patterns occupied by the ink to form each reservoir 64, and hermetically closing, by hot pressing, the ends of each reservoir with the exception of a filling end 84, visible in FIG. 5.

The method then includes a step for evacuating the reservoirs 64, and then filling the reservoirs 64 with the heat pipe fluid 58. All the reservoirs 64 are filled from only one filling end 84 by virtue of the presence of three temporary filling pipes 86, each filling pipe 86 being laid out between two successive reservoirs 64 at the cold parts 68.

After the reservoirs 64 are filled, the filling end 84 and the temporary filling pipes 86 are removed by cutting, and the heat pipes 54 are hermetically welded at the cut locations, such that the reservoirs 64 are individually closed.

As a variant, after the reservoirs 64 are filled, the filling end 84 and the temporary filling pipes 86 are sealed by clinching, i.e. by stamping said end and said temporary pipes between a punch and a die, such that the reservoirs 64 are individually closed. According to this variant, each temporary filling pipe is in the shape of an arc of a circle, as represented in FIG. 5, or in the shape of a rectilinear section between two successive connecting pipes 70. The die or punch used for the clinching step is, for example, dovetail-shaped. The clinching step provides for further improving the resistance to the pressure from the closure of the reservoirs 64, and the reservoirs 64 are therefore more tightly sealed against a leakage of the heat pipe fluid 58.

As another variant, after the reservoirs 64 are filled, the filling end 84 and the temporary filling pipes 86 are sealed during a compression step by stamping, such that the reservoirs 64 are individually closed.

In addition, the cutting step, or the clinching step, or the compression step, are performed after a step for distributing the bulk of the heat pipe fluid 58 between the various reservoirs 64.

At the end of the manufacturing method, the set of heat pipes is as represented in FIG. 4.

Each hot part 66 of a heat pipe is then laid out in the shape of a half-cylinder, in order to be inserted into the corresponding cylindrical tube of the solar collector 26.

The operation of the electrical energy generation plant, and in particular of the solar collectors, will now be described.

The electrical energy generation plant is referred to as a low-temperature plant, in view of the maximum temperature of the hot water production system, equal to 150° C., which is markedly less than that used in other thermal solar power plants, such as cylindrical-parabolic collector power plants, solar tower power plants and parabolic collector power plants, where the temperature of the heat transfer fluid circulating in the hot reservoir is greater than 400° C.

The solar collectors 26 of the heating means 6 collect solar radiation during the day, and then transmit the thermal energy associated with the solar radiation to the first heat transfer fluid 10.

More specifically, the solar radiation is absorbed by the absorption layer 52 of each solar collector, the insulation means 56 allowing the solar radiation to pass through. The thermal energy associated with the absorption of the solar radiation is then transmitted to the heat pipes 54. Dissipation of thermal energy outside the solar collector 26 is limited by virtue of the thermal insulation means 56, the vacuum 76 providing thermal insulation and the outer tube providing the greenhouse effect.

The thermal energy transmitted to the hot part 66 of each heat pipe gradually brings about a change of phase of the heat pipe fluid 58, from its liquid state to its gaseous state. The heat pipe fluid in the gaseous state then rises in the direction of the respective cold part 68 of each heat pipe, through the various channels 70 of the reservoir. Since the reservoir 64 is applied at least locally against the inner tube 74, which in turn is in contact with the absorption layer 52, in the hot part 66 of the pipe, thermal conduction is improved between the absorption layer 52 and the heat pipe fluid 58, such that heat losses by black-body radiation, which evade the greenhouse effect, are reduced.

The heat transported by the heat pipe fluid 58 from the hot part 66 to the cold part 68 is then transmitted to the first heat transfer fluid 10 by thermal conduction between the channels 70 arranged in the cold part and the pipe 48 of the first circuit. This thermal conduction hence brings about a rise in the temperature of the heat transfer fluid 10 and a fall in the temperature of the heat pipe fluid 58.

Following the fall in temperature of the heat pipe fluid 58, the heat pipe fluid 58 gradually changes phase again, from its gaseous state to its liquid state. The heat pipe fluid in the liquid state then descends back down by gravitation from the cold part 68 to the hot part of 66, by virtue of the angle of inclination, in order to transport again the thermal energy arising from the solar radiation.

The storage means 12 are hence used as buffers between the thermal energy produced by the solar collectors 26 of the heating means and that consumed by the electricity-producing thermodynamic machine 6. The storage means 12 therefore enable electricity production to be decoupled from solar availability.

Several operating modes can be envisaged as regards the hot water production system 2, using the valves 28, the mixer 20 and the pumps 22, 30: only storage of thermal energy, direct production of thermal energy, storage and production of thermal energy, withdrawal of thermal energy and direct production of thermal energy, and only withdrawal of thermal energy.

The feedback loop 18 is used to adapt the quantity of thermal energy supplied by the hot water production system 2 to the electricity-producing thermodynamic machine 6.

By virtue of the heat brought by the hot water production system 2, the working fluid 40 changes from the liquid state to the gaseous state in the boiler 42. The working fluid 40 thus arrives in the gaseous state at the inlet of the turbine 43. The working fluid in the gaseous state then decreases in pressure in the turbine 43 and supplies mechanical energy, rotationally driving the rotor of the turbine. This mechanical energy is transmitted to the generator 44 in order to produce electricity. At the outlet of the turbine 43, the working fluid 40 is still in the gaseous state, and under a markedly lower pressure.

The working fluid 40 then changes back to the liquid state in the condenser 45 in contact with the heat sink 4. At the outlet of the condenser 45, the working fluid 40 in the liquid state is then driven by the pump 46 in order to return to the inlet of the boiler 42 and utilize once again the heat supplied by the hot water production system 2.

Figure 6:
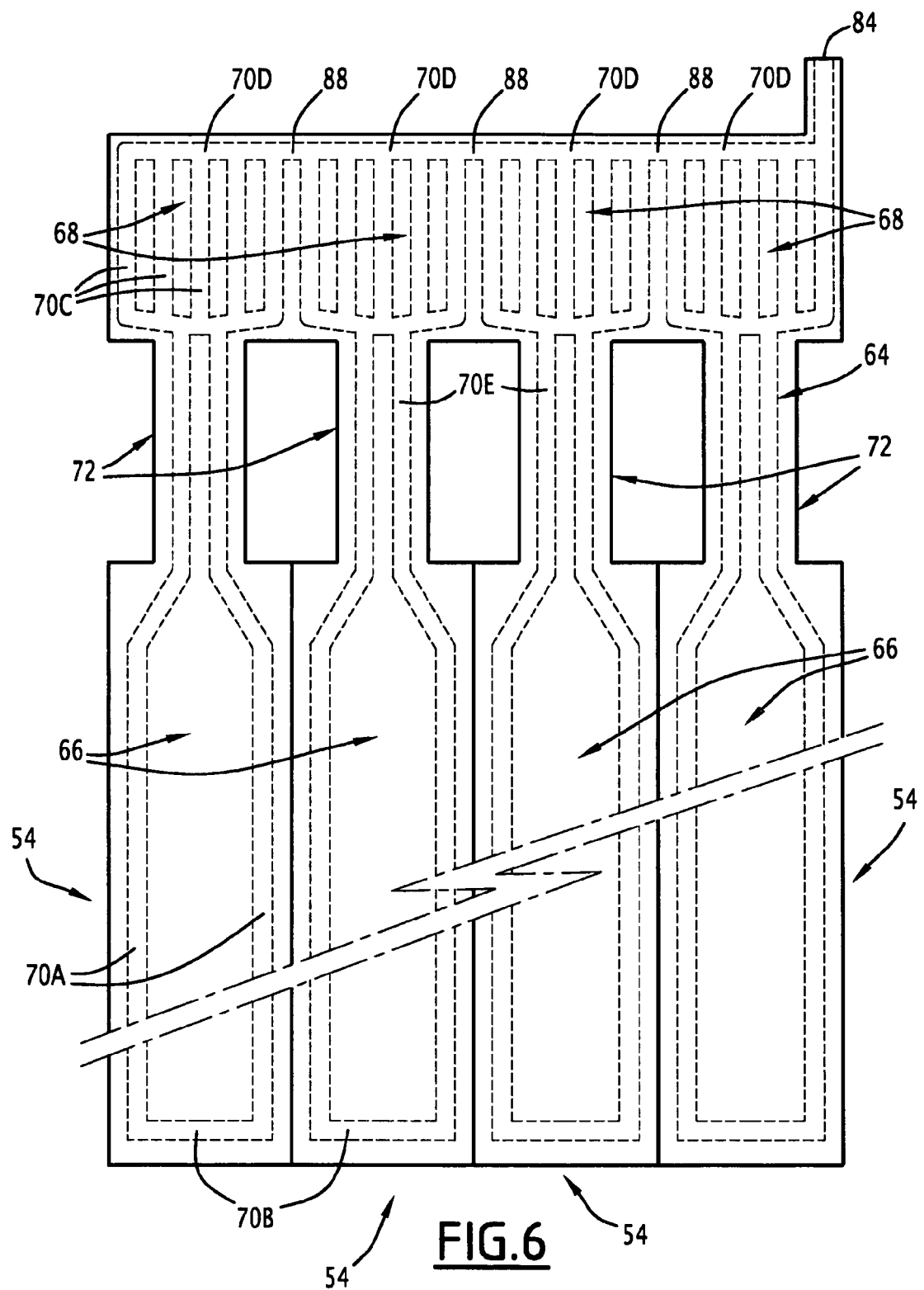
FIG. 6 is a view similar to that of FIG. 4 according to a second embodiment of the invention.

FIG. 6 illustrates a second embodiment, for which items similar to the embodiment described previously are labeled using identical references.

According to this second embodiment, the reservoirs 64 of the heat pipes are hydraulically interlinked so as to form a single reservoir 64 extending over the plurality of heat pipes 54. The set of heat pipes comprises third connecting pipes 88. Each third connecting pipe 88 links two adjacent reservoirs 64. More specifically, each third connecting pipe 88 is connected between two adjacent and aligned second connecting pipes 70D.

The method for manufacturing this second embodiment is identical to that of the first embodiment, and is therefore not described again.

The operation of this second embodiment is identical to that of the first embodiment, and is therefore not described again.

The person skilled in the art will understand that, according to this second embodiment, the set of heat pipes does not include the temporary filling pipes of the first embodiment, since it comprises permanent connecting pipes 88. The person skilled in the art will also understand that the manufacturing method does not include, after the reservoirs are filled, a cutting step, or a clinching step, or a compression step for the connecting pipes 88, since the reservoirs 64 of the heat pipes are hydraulically interlinked and are not individually closed.

Thus, the set of heat pipes according to the invention enables the manufacturing costs to be reduced, since four heat pipes 54 are produced simultaneously, with a common filling of the reservoirs 64. The production of the set of solar collectors 26 is facilitated from this, since the four heat pipes are laid out simultaneously around the transport pipe 48.

The cold parts 68 of the four heat pipes form a common cold part, having an area greater than or equal to the sum of the areas of four conventional heat pipes that are independent from one another, thereby improving thermal exchanges between the solar collectors 26 and the first transport circuit 14.

The cold parts 68 of the heat pipes are mechanically interlinked, integrally with one another, thereby improving the mechanical rigidity of the four solar collectors 26 around the transport pipe 48, and reducing the risks of warping of the solar collectors 26 with respect to the transport pipe 48.

It is thus understood that the invention provides for reducing the manufacturing cost of the set of heat pipes and the fitting cost of the collectors.

What is claimed is:

1. A set of heat pipes for solar collectors, the set comprising a plurality of heat pipes:
   each heat pipe being capable of being-laid out in a respective solar collector;
   each heat pipe comprising a heat pipe fluid, a reservoir, a first sheet and a second sheet joined with each other to form the reservoir therebetween,
   wherein the first sheet and the second sheet each having an inner surface and an outer surface such that the outer surface of the first sheet faces the inner surface of the second sheet;

the reservoir of each heat pipe containing the heat pipe fluid, each reservoir includes a hot part for evaporating the heat pipe fluid and a cold part for condensing the heat pipe fluid, and each of the reservoirs being formed in an interstice between the outer surface of the first sheet facing the inner surface of the second sheet, wherein the reservoir of at least two of the plurality of heat pipes are formed by the first sheet and the second sheet, wherein the cold parts of said at least two of the plurality of heat pipes are connected with each other and the hot parts of said at least two of the plurality of heat pipes are separated from each other.

2. The set according to claim 1, wherein the reservoirs of the heat pipes are hydraulically interlinked to form a single reservoir extending over the plurality of the heat pipes.

3. The set according to claim 1, wherein the sheets are metal sheets.

4. The set according to claim 3, wherein the metal sheets are made of aluminum.

5. The set according to claim 1, wherein at least two of the cold parts are connected via a connecting portion of the first sheet and the second sheet.

6. The set according to claim 1, wherein the first sheet and the second sheet are joined together along a width of the hot part except for the interstice forming the reservoir.

7. The set according to claim 1, wherein the hot part is flat and the first sheet is on top of the second sheet.

8. The set according to claim 1, wherein the first sheet and second sheet are joined by hot rolling.

9. The set according to claim 1, wherein the first sheet and the second sheet are joined by a diffusion weld.

10. A set of solar collectors, the set comprising a plurality of solar collectors, each collector comprising:

an outer tube of circular cross-section, having two ends and being closed at a first of its ends, a solar radiation absorption layer arranged inside the outer tube, a heat pipe of a set of heat pipes, wherein the set of heat pipes is in accordance with claim 1, said heat pipe being laid out in said solar collector, each outer tube being hermetically closed around the respective heat pipe at the second of its ends, and a vacuum being formed inside said outer tube.

11. The set of solar collectors according to claim 10, wherein each of the solar collectors additionally comprises an inner tube of circular cross-section, arranged inside the outer tube, each of the inner tube and the outer tube having a first end and a second end and being closed at the first ends, and the inner and outer tubes being sealed one to the other at the second ends, the inner and outer tubes being separated by vacuum.

12. A set of solar collectors according to claim 10, wherein the hot part of each heat pipe is in the shape of a half-cylinder.

13. The set of solar collectors according to claim 10, wherein the cold part of each heat pipe is suitable for being arranged in contact with a cylindrical pipe, and in that said cold part is in the shape of a half-cylinder.

14. The set of solar collectors according to claim 10, wherein the solar collectors are substantially parallel with one another, and in that the set of solar collectors includes at least one connecting bar interconnecting the solar collectors, said bar being arranged substantially perpendicularly to the solar collectors and in contact with each outer tube near its first end.

15. A system for producing hot water from solar energy comprising:

a set of solar collectors in accordance with claim 10 suitable for heating a heat transfer fluid from solar energy, and a circuit for transporting the heat transfer fluid between the solar collectors and a hot water distributor.

16. The set of solar collectors according to claim 11, wherein the inner tube of each of the collectors includes an outer surface oriented towards the outer tube of said collector, and an inner surface, in that the absorption layer of said collector is arranged against said outer surface, and in that, for the hot part of the heat pipe of said collector, the reservoir is applied against said inner surface.

17. The set of solar collectors according to claim 12, wherein the cold part of each heat pipe is suitable for being arranged in contact with a cylindrical pipe, and in that said cold part is in the shape of a half-cylinder, and wherein an axis of the half-cylinder of the hot part of each heat pipe is different from an axis of the half-cylinder of the cold part of the corresponding heat pipe, and in that the heat pipe includes a narrowing of its circumferential or longitudinal width with respect to its width in the regular part of the hot and cold parts, between the hot part and the cold part forming a connecting joint.

18. A plant for generating electrical energy from solar energy comprising:

a hot water production system in accordance with claim 15, a heat sink, and an electricity-producing thermodynamic machine, using the hot water produced by said system and the heat sink.

19. A method for manufacturing a set of heat pipes for solar collectors, comprising a plurality of heat pipes, the method including the steps of:

assembling a first sheet and a second sheet forming between them a plurality of reservoirs of at least two heat pipes, while maintaining a connecting portion between two adjacent heat pipes among said at least two heat pipes, wherein each of the plurality of reservoirs being formed in an interstice between the outer surface of the first sheet facing the inner surface of the second sheet, cutting the set of heat pipes according to the external outline of each of hot parts, such that the hot parts of the heat pipes are separate and configured to be inserted into respective solar collectors, and filling the reservoirs with a heat pipe fluid.

20. The method according to claim 19, wherein the reservoirs are filled from only one filling end.

21. The method according to claim 19, wherein the set of heat pipes includes including at least one temporary filling pipe, the at least one temporary filling pipe being laid out between two successive said reservoirs at cold parts, wherein the method includes, after the reservoirs are filled, the step of cutting the at least one temporary filling pipe and hermetically welding the heat pipes at the cut locations, such that the reservoirs are closed individually.

22. The method according to claim 19, further comprising the step of forming the hot parts into a desired shape.

23. The method according to claim 22, wherein shape of each of the hot parts is a half-cylinder.

24. The method according to claim 22, further comprising step of depositing a special ink on the first sheet according to a desired pattern for the reservoir of each of the heat pipe.

25. The method according to claim 24, wherein the step of depositing a special ink is done by screen printing.

* * * * *